(12) United States Patent
Antony

(10) Patent No.: US 9,778,870 B2
(45) Date of Patent: Oct. 3, 2017

(54) POWER MANAGEMENT FOR A DISTRIBUTED STORAGE SYSTEM ACCESSIBLE BY A CLUSTER IN A VIRTUALIZED COMPUTING ENVIRONMENT

(71) Applicant: VMWARE, INC., Palo Alto, CA (US)

(72) Inventor: Jinto Antony, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 17 days.

(21) Appl. No.: 14/746,872

(22) Filed: Jun. 23, 2015

(65) Prior Publication Data

US 2016/0320996 A1    Nov. 3, 2016

(30) Foreign Application Priority Data

Apr. 28, 2015 (IN) .......................... 2167/CHE/2015

(51) Int. Cl.
*G06F 12/00* (2006.01)
*G06F 13/00* (2006.01)
*G06F 13/28* (2006.01)
*G06F 3/06* (2006.01)
*G06F 1/32* (2006.01)

(52) U.S. Cl.
CPC .......... *G06F 3/0625* (2013.01); *G06F 1/3287* (2013.01); *G06F 3/065* (2013.01); *G06F 3/067* (2013.01); *G06F 3/0619* (2013.01); *G06F 3/0617* (2013.01); *G06F 3/0634* (2013.01)

(58) Field of Classification Search
CPC .... G06F 3/0625; G06F 3/0619; G06F 3/0617; G06F 3/0616; G06F 3/0614; G06F 3/065; G06F 3/067; G06F 3/0683; G06F 3/0634; G06F 1/3287; G06F 1/3203; G06F 1/32; G06F 1/3234
USPC ......... 711/161, 162; 713/300, 320, 323, 324
See application file for complete search history.

(56) References Cited

U.S. PATENT DOCUMENTS

| | | | | |
|---|---|---|---|---|
| 2008/0250267 A1* | 10/2008 | Brown | ............... | G06F 11/1482 714/4.1 |
| 2010/0070784 A1* | 3/2010 | Gupta | ................... | G06F 1/3203 713/310 |
| 2010/0082729 A1* | 4/2010 | Shitomi | ............... | G06F 1/3203 709/202 |
| 2016/0011809 A1* | 1/2016 | Matsuzawa | .......... | G06F 3/0619 711/113 |
| 2016/0028587 A1* | 1/2016 | Garg | ................... | H04L 41/0806 709/224 |

* cited by examiner

*Primary Examiner* — Tuan Thai
*Assistant Examiner* — Shane Woolwine

(57) ABSTRACT

An example method is provided to perform power management for a distributed storage system accessible by a cluster in a virtualized computing environment. The method may comprise, in response to detecting that a power-off requirement of a host from the cluster is satisfied, retrieving virtual machine data from a first storage resource of the host, storing the virtual machine data on a second storage resource of the host, and powering off one or more components of the host. The second storage resource is configured to be accessible when the one or more components of the host are powered off.

18 Claims, 9 Drawing Sheets

POWER MANAGEMENT FOR A DISTRIBUTED STORAGE SYSTEM ACCESSIBLE BY A CLUSTER IN A VIRTUALIZED COMPUTING ENVIRONMENT

RELATED APPLICATIONS

Benefit is claimed under 35 U.S.C. 119(a)-(d) to Foreign application Serial No. 2167/CHE/2015 filed in India entitled "POWER MANAGEMENT FOR DISTRIBUTED STORAGE SYSTEMS", on Apr. 28, 2015, by VMware, Inc., which is herein incorporated in its entirety by reference for all purposes.

BACKGROUND

Unless otherwise indicated herein, the approaches described in this section are not admitted to be prior art by inclusion in this section.

Virtualization allows the abstraction of hardware resources and the pooling of these resources to support multiple virtual machines in a virtualized computing environment. For example, through virtualization, virtual machines running different operating systems may be supported by the same physical machine (e.g., referred to as a "host"). Each virtual machine is generally provisioned with virtual resources that provide similar functions as the physical hardware of the host, such as central processing unit (CPU) resources, memory resources, storage resources and network resources to run an operating system and applications.

Storage resources are required by a virtual machine to store data relating to the operating system and applications run by the virtual machine, etc. In a distributed storage system, storage resources of a cluster of hosts may be aggregated to form a single shared pool of storage. Virtual machines supported by the hosts within the cluster may then access the pool of storage to store data. However, for the distributed storage system to operate, all hosts within the cluster are generally required to be powered on at all times.

DETAILED DESCRIPTION

Figure 1:
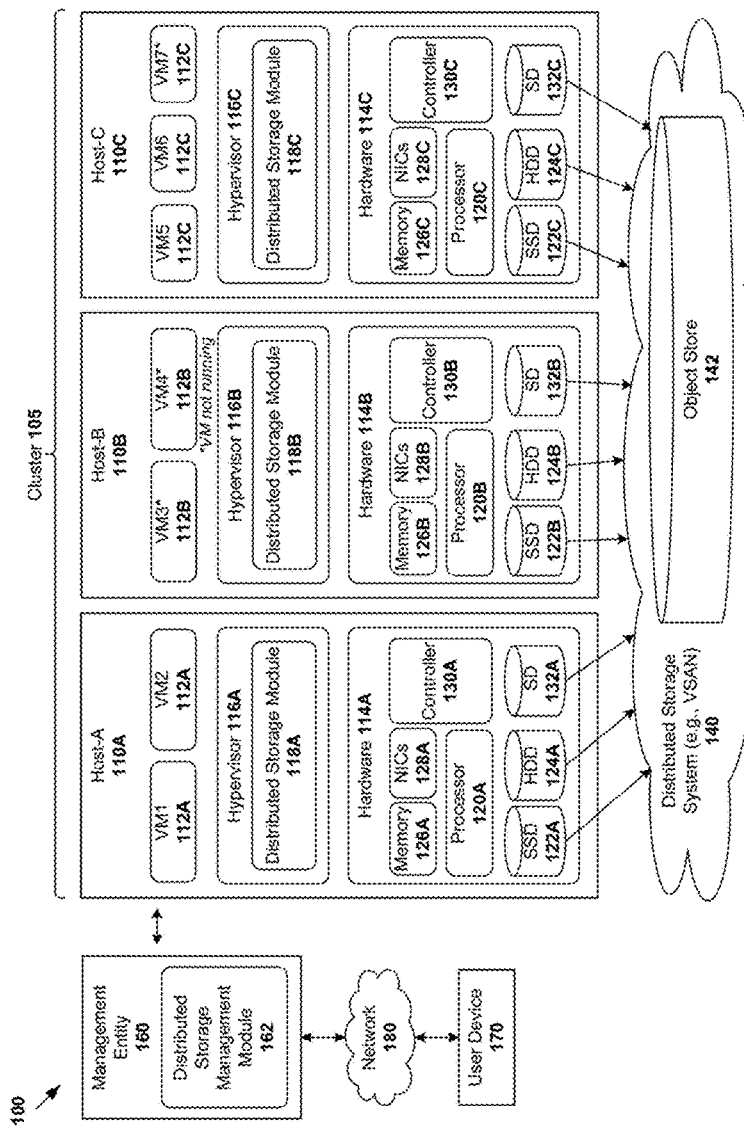
FIG. 1 is a schematic diagram illustrating an example virtualized computing environment that includes a distributed storage system accessible by a cluster.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

The challenges of operating a distributed storage system will now be further explained using FIG. 1, which is a schematic diagram illustrating example virtualized computing environment 100 that includes distributed storage system 140 accessible by cluster 105. Although an example is shown, it should be understood that virtualized computing environment 100 may include additional or alternative components, and each component may have a different configuration. In the example in FIG. 1, virtualized computing environment 100 includes cluster 105 of hosts (also known as "host computers", "physical servers", "server systems", etc.), such as Host-A 110A, Host-B 110B and Host-C 110C. In the following, reference numerals with a suffix "A" refer to elements relating to Host-A 110A, suffix "B" to Host-B 110B and suffix "C" with Host-C 110C.

Each host 110A/110B/110C includes suitable hardware 114A/114B/114C and executes virtualization software (e.g., hypervisor 116A/116B/116C) to support multiple respective virtual machines 112A/112B/112C. Hypervisor 116 A/116B/116C maintains a mapping between hardware 114A/114B/114C and virtual resources allocated to virtual machines 112A/112B/112C. For example, Host-A 110A executes hypervisor 114A and includes hardware 114A with components such as processor 120A (e.g., central processing unit (CPU)), local storage disks such as solid state drive (SSD) 122A and hard disk drive (HDD) 124A, memory 126A (e.g., random access memory) and network interface cards (NICs) 128A. Further, hardware 114A includes controller 130A associated with a Secure Digital (SD) card 132A. Similarly, hardware 114B/114C of Host-B 110B/110C includes processor 120B/120C, SSD 122B/122C, HDD 124B/124C, memory 126B/126C, NICs 128B/128C, controller 130B/130C and SD card 1321B/132C. In practice, cluster 105 may include any suitable number of hosts (e.g., between 3 and 64, etc.), each host any suitable number of virtual machines.

Cluster 105 may aggregate their storage resources to form distributed storage system 140 representing a shared pool of storage resources. Distributed storage system 140 may employ any suitable technology, such as Virtual Storage Area Network (VSAN) from VMware, Inc. For example, Host-A 110A, Host-B 110B and Host-C 110C may aggregate local storage disks 122A, 124A, 122B, 124B, 122C and 124C into object store 142 (also known as a datastore). Any suitable disk format may be used, such as virtual machine file system leaf level (VMFS-L), Virtual SAN on-disk file system, etc. Host-AHost-BHost-C.

Distributed storage system 140 may be used to store virtual machine data relating to virtual machines 112A/112B/112C labelled "VM1" to "VM7." For example, "VM1" and "VM2" are supported by Host-A, "VM3" and "VM4" by Host-B, and "VM5", "VM6" and "VM7" by Host-C. To manage distributed storage system 140, each host 110A/110B/110C may execute distributed storage module 118A/118B/118C (e.g., a "VSAN module" for a VSAN-based cluster), and management entity 160 may implement a corresponding distributed storage management module 162.

In practice, management entity 160 may be implemented by one or more virtual or physical entities, and provide other management functionalities (e.g., for managing objects such as hosts 110A/110B/110C, virtual machines 112A/112B/112C, etc.). Users operating remote user devices 170 may access functionalities of management entity 160 via network 180, such as to create or update cluster 105, configure distributed storage system 140, etc. User device 170 may be any suitable computing device, such as a user workstation, client device, mobile device, etc.

Conventionally, it is necessary for all hosts (e.g., Host-A 110A, Host-B 110B and Host-C) within cluster 105 to be powered on all the times. Since powering off a host also causes its storage resources to be powered off, all hosts are powered on to ensure that the data stored on the hosts is accessible. For example, even when "VM3" and "VM4" are not running, Host-B cannot be powered off to maintain access to any data stored on SSD 122B and HDD 124B of Host-B.

Keeping all hosts running even when resource utilization is low makes distributed storage system 140 inefficient and expensive to run because of the additional power and resource consumption. For example, a feature called Distributed Power Management (DPM) is generally used to power off host 110A/110B/110C in periods of low resource utilization and power on host 110A/110B/110C when resources are required. However, DPM cannot be used on existing VSAN-based cluster 105 and is therefore ineffective to save power. This problem is exacerbated as the number of hosts increases.

Power Management

According to examples of the present disclosure, power management may be implemented to reduce power consumption in virtualized computing environment 100. In particular, one or more components of Host-B 110B within cluster 105 may be powered off when a power-off requirement is satisfied, such as when no virtual machine 112B (e.g., "VM3" and "VM4") is running. To maintain access to the data stored on Host-B 110B after being powered off, Host-B 110B may contribute different types of storage resources to distributed storage system 140. For example, Host-B 110B may contribute storage disks SSD 122B and HDD 124B ("first storage resource" of Host-B 110B) that are configured to be accessible when Host-B 110B is powered on, and SD card 132B ("second storage resource" of Host-B 110B) associated with controller 130B. SD card 132B is configured to be accessible even when one or more components of Host-B 110B are powered off.

Similarly, Host-A 110A may contribute not only storage disks SSD 122A and HDD 124A ("first storage resource" of Host-A 110A), but also SD card 132A ("second storage resource" of Host-A 110A) associated with controller 130A to distributed storage system 140. Also, Host-C 110C may contribute storage disks SSD 122C and HDD 124C ("first storage resource" of Host-C 110C), and SD card 132C ("second storage resource" of Host-C 110C) associated with controller 130C. As such, according to examples of the present disclosure, distributed storage system 140 is configured to include both first and second storage resources from all hosts 110A/110B/110C.

Figure 2:
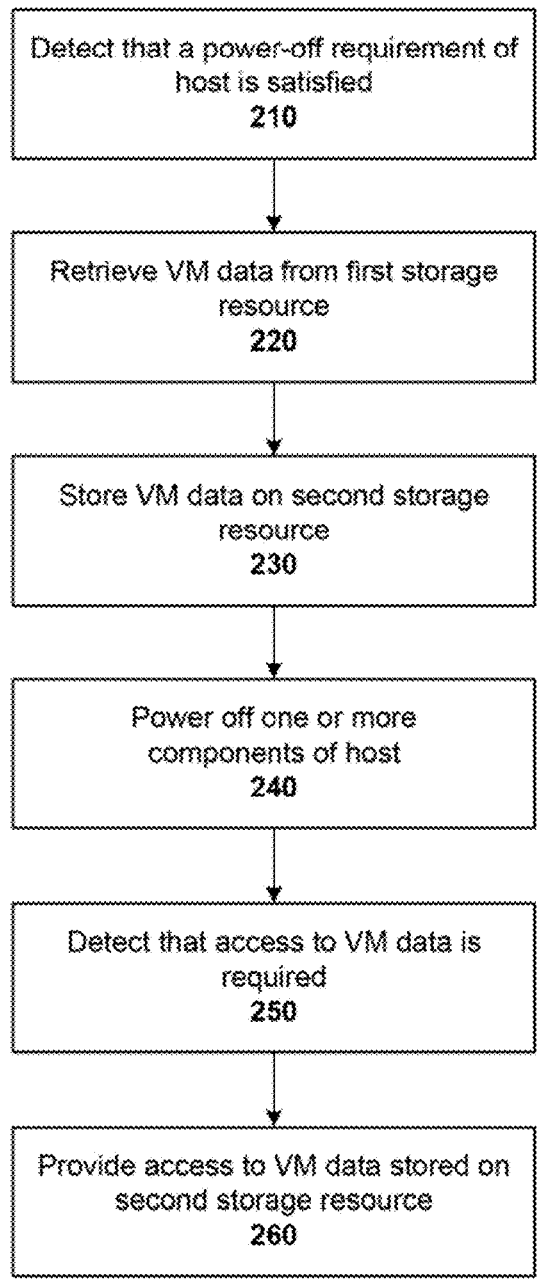
FIG. 2 is a flowchart of an example process to perform power management for a distributed storage system.

Host-B 110B is generally powered on, but one or more of its hardware components 114B may be powered off when a power-off requirement is satisfied. In more detail, FIG. 2 is a flowchart of example process 200 to perform power management for distributed storage system 140 accessible by cluster 105 in virtualized computing environment 100. Example process 200 may include one or more operations, functions, or actions illustrated by one or more blocks, such as blocks 210 to 260. The various blocks may be combined into fewer blocks, divided into additional blocks, and/or eliminated based upon the desired implementation.

In practice, example process 200 may be performed using any suitable computing system in virtualized computing environment 100, such as host 110A/110B/110C (e.g., distributed storage module 118A/118B/118C), management entity 160 (e.g., distributed storage management module 162), a combination of host 110A/110B/110C and management entity 160, or any alternative or additional component, etc. Although the following examples refer to Host-B 110B, similar power management may be performed for Host-A 110A, Host-C 110C or any other host within cluster 105.

Figure 3:
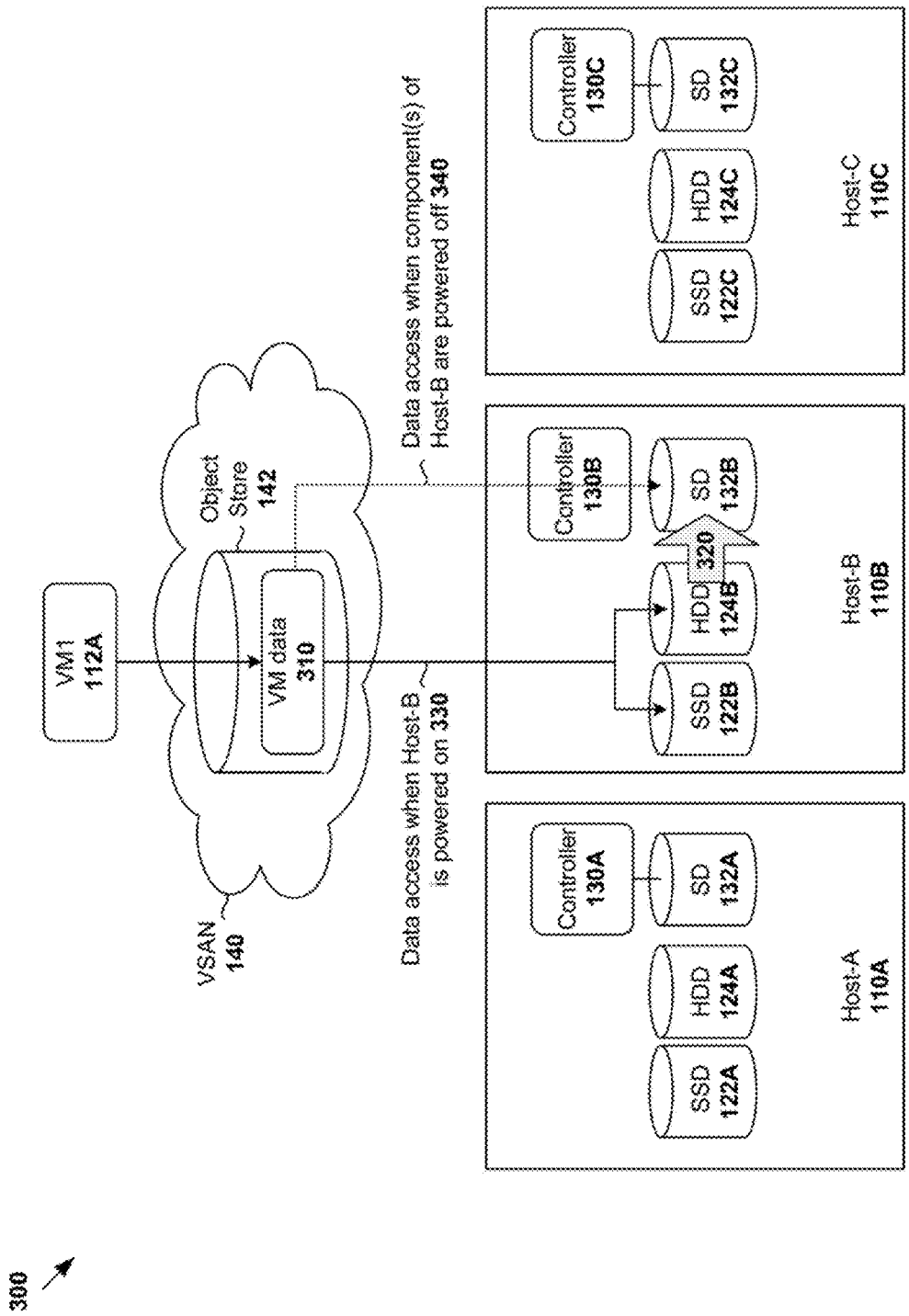
FIG. 3 is a schematic diagram illustrating example power management for a distributed storage system according to the example process in FIG. 2.

FIG. 2 will be explained with reference to FIG. 3, which is a schematic diagram illustrating example power management 300 for distributed storage system 140 according to example process 200 in FIG. 2. For simplicity, only relevant components of host 110A/110B/110C are shown in FIG. 3. As explained using FIG. 1, object store 142 of distributed storage system 140 (e.g., VSAN) may be used to store virtual machine data 310 relating to VM1 112A supported by Host-A 110A. In the example in FIG. 3, virtual machine data 310 is stored on, and accessible from, SSD 122A and 124A (i.e., first storage resource) of Host-B 110B.

At block 210 in FIG. 2, example process 200 includes detecting that a power-off requirement of Host-B 110B is satisfied. Any suitable power-off requirement may be used, such as low resource utilization of Host-B 110B or when maintenance is required (e.g., to upgrade firmware). For example, the requirement of Host-B 110B may be satisfied when virtual machines 112B "VM3" and "VM4" are not running.

At blocks 220 and 230 in FIG. 2, in response to detecting that the power-off requirement of Host-B 110B is satisfied, virtual machine data (see 310 in FIG. 3) may be retrieved from the first storage resource (e.g., SSD 122B or HDD 124B) and stored on the second storage resource (e.g., SD card 132B) of Host-B 110B. See also arrow 320 in FIG. 3, which represents blocks 220 and 230 in FIG. 2. Then, at block 240 in FIG. 2, one or more components of Host-B 110B are powered off Further, at blocks 250 and 260 in FIG. 2, in response to detecting that access to virtual machine data 310 relating to VM1 112A is required from Host-B 110B and one or more components of Host-B 110B are powered off, access to virtual machine data 310 stored on the second storage resource (e.g., SD card 132B) of Host-B 110B may be provided. As such, in the example in FIG. 1, full line 330 represents access of virtual machine data 310 from SSD 122B or HDD 124B when Host-B 110B is powered on. Otherwise, when one or more components of Host-B 110B are powered off, dotted line 340 represents access from SD card 132B.

In one example, when Host-B 110B is powered off, controller 130B provides access to virtual machine data 310 on SD card 132B under the control of distributed storage management module 162 of management entity 160. When powered on, access to virtual machine data 310 on SSD 122B/HDD 124B may be provided by distributed storage module 118B under the control of distributed storage management module 162 of management entity 160. Here, the term "providing access" to virtual machine data 310 may include distributed storage module 118B or controller 130B processing access requests, which may be received via distributed storage management module 162 of management entity 160.

Throughout the present disclosure, the terms "first storage resource" and "second storage resource" are merely used for ease of discussion to distinguish one element from another, and are not used to denote a particular order. As shown in FIG. 1 and FIG. 3, the first storage resource of Host-B 110B may include at least one cache storage device in the form of SSD 122B for read caching and write buffering, and at least one capacity device in the form of HDD 124B for persistent data storage, etc.

SD card 132B represents a second storage resource of Host-B 110B that provides an extension to the first storage resource to facilitate data access when components of Host-B 110-B are powered off. As will be explained using FIG. 4, controller 130B may facilitate access to virtual machine data 310 from SD card 132B. Controller 130B and SD card 132B may be powered by a power source even when Host-B 110B is powered off.

Virtual machine data 310 may be any suitable data, such as virtual machine home objects, swap objects, virtual disk, snapshots, memory, etc. A virtual disk may be used to store virtual machine data required by a guest operating system and any application running on virtual machine VM1 112A. Here, the term "virtual disk" may refer generally to files on a file system that appear as a single logical hard disk to the guest operating system. As will be explained further using FIG. 5, FIG. 7 and FIG. 8, a data placement policy may be used to place any suitable virtual machine data on distributed storage system 140.

Using example process 200, components of Host-B 110B may be powered off while maintaining access to virtual machine data 310. Since Host-B 110B or any other host within cluster 105 does not have to be fully powered on at all times, example process 200 may be used to reduce costs associated with power consumption and hardware maintenance of cluster 105. In practice, example process 200 may be integrated with existing distributed storage module 118A/118B/118C on host 110A/110B/110C, and distributed storage management module 162 on management entity 160 to improve power management in virtualized computing environment 100.

First and Second Storage Resources

Figure 4:
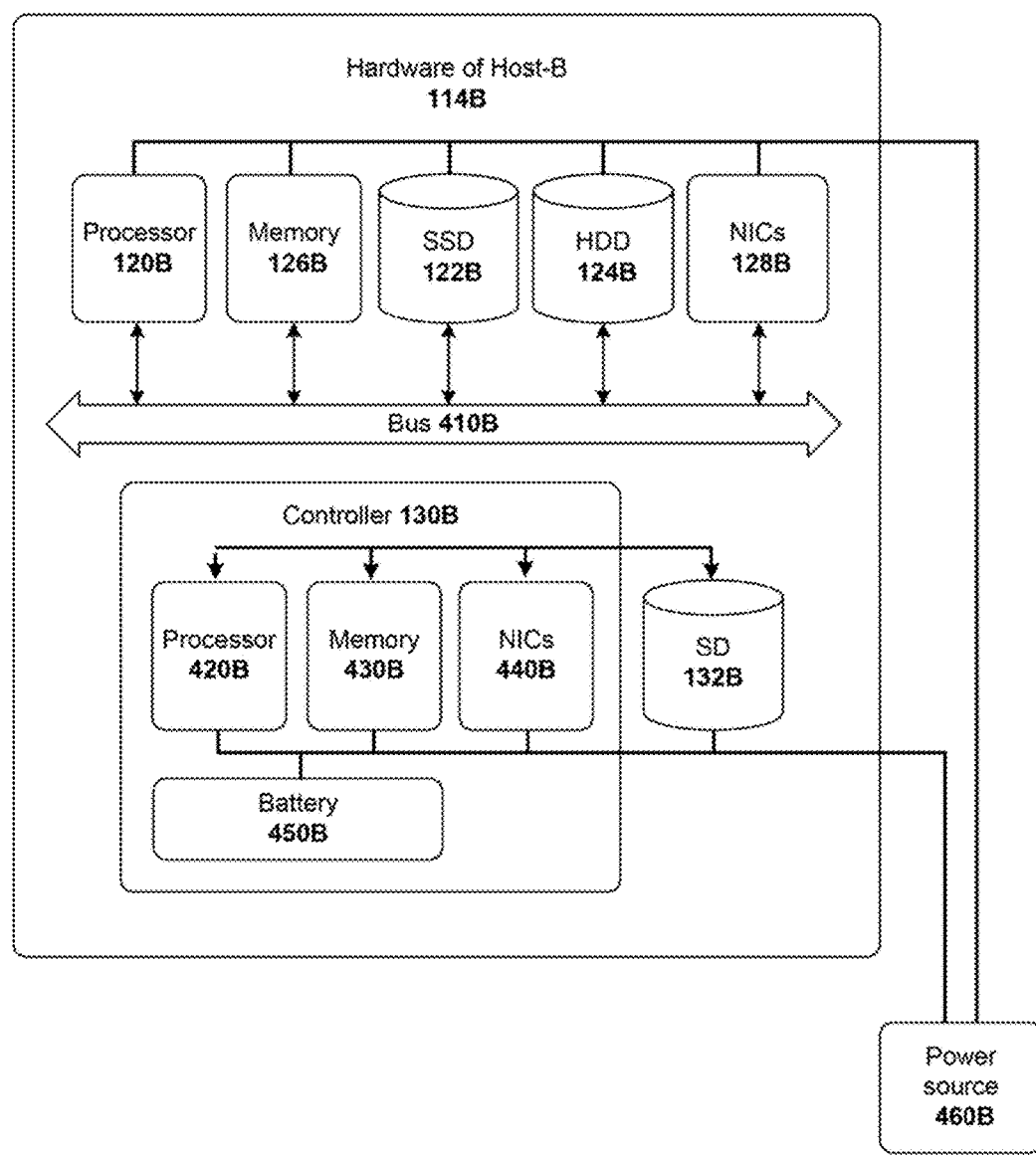
FIG. 4 is a schematic diagram illustrating an example computing system acting as a host.

FIG. 4 is a schematic diagram illustrating example computing system 400 acting as Host-B 110B. Although an example is shown, it should be understood that Host-B 110B may include additional or alternative components, and may have a different configuration. Host-A 110A, Host-C 110C and any other host from cluster 105 may have the same or different configuration. As explained using FIG. 1, Host-B 110B includes processor 120B, memory 126B, first resource storage that includes SSD 122B and HDD 124B, network interface such as NICs 128B, and bus 410B that facilitates communication among the illustrated components and any other alternative or additional components.

First storage resource may include any suitable physical storage device that is local or connected to Host-B 110B. For example, SSD 122B and HOD 124B are shown in FIG. 1i and FIG. 4, but any additional or alternative device may be used such as solid-state hybrid drive (SSHD), peripheral component interconnect (PCI) flash storage, serial advanced technology attachment (SATA) storage, serial attached small computer system interface (SAS) storage, Integrated Drive Electronics (IDE) disks, Universal Serial Bus (USB) disks etc. There may also be multiple and/or cache devices. A cache device (e.g., SSD 122B) may be mapped to multiple capacity devices to, for example, store copies of the most frequently used data to improve the overall performance.

Controller 130B may be any system, device or component that is operational or accessible regardless of whether Host-B 110B is powered on. In practice, controller 130B may be an "out-of-band" controller or baseboard management controller (BMC), such as an Integrated Dell Remote Access Controller (iDRAC), Hewlett Packard's Integrated Lights-Out (iLO), Lenovo's ThinkServer EasyManage, etc. Controller 130B may provide additional "out-of-band" management functionalities to facilitate remote management of Host-B 110B regardless of whether Host-B 110B is powered on. This allows an administrator to monitor or configure Host-B 110B via user device 170 (e.g., using a web browser or command line interface) remotely without physically visiting host even when the server is powered off.

In the example in FIG. 4, controller 130B includes processor 420B that is communicatively coupled with memory 430B (also referred to as "third storage resource"), and network interface such as NICs 440B. Controller 130B provides access to SD card 132B. Although an SD card 132B is illustrated in FIG. 4, any other suitable physical storage device may be used, such as a non-volatile memory card in the form of virtual flash secure digital (vFlash SD) card, etc. One advantage of the vFlash SD card is that it does not rely on costly network infrastructure for its data to be retrieved from a remote location.

Throughout the present disclosure, the terms "powering off" Host-B 110B and "powered off" may refer to the powering off of one or more components such as processor 120B, memory 126B, first storage resource in the form of SSD 122B and HDD 124B, and network interface 128B. When these components are powered off, any operating system and applications executed by processor 120B will also be stopped or paused. In this case, Host-B 110B may be switched to a low power state or no power state.

In practice, power states of Host-B 110B may be configured based on based on Advanced Configuration Power Interface (ACPI) specification. ACPI defines a set of power states with different levels of power consumption for a host. For example, the power states may include a combination of global "Gx" states and sleep "Sx" states, such as "G0(S0), Working", "G1(S1), Sleeping—Power on Suspend", "G1 (S2), Sleeping—CPU powered off", "G1 (S3), Sleeping—Standby", "G1(S4), Sleeping—Hibernation", "G2(S5)—Soft Off", "G3—Mechanical Off", etc. For example, when powered on, Host-B 110B may be operating in the G0(S0) state. When one or more components are powered off, Host-B 110B may be operating in a low power state or no power state. Various device "Dx" states, processor "Cx" states, and performance "Px" states, etc., may also be used.

To implement power management according to example process 200 in FIG. 2, controller 130B may independently draw power from power source 460 regardless of whether Host-B 110B is powered on or off. As such, when Host-B 110B is powered off, controller 130B and SD card 132B are still powered on. This allows controller 130B to provide access to SD card 132B via network interface 440B.

Power source 460 may be any suitable source of electrical energy, such as an alternating current (AC) or direct current (DC) source, battery, etc.

Additionally or alternatively, controller 130B and SD card 132B may be powered by on-board battery 450B as a backup power source. In practice, since controller 130B is battery-backed even when Host-B 110B is completely removed from power source 460B, SD card 132B may still be accessed for a period of time, say 30 minutes. This further improves the resiliency of distributed storage system 140 towards power failure. Although power source 460B and battery 450B are shown as examples, any additional or alternative power source may be used.

Memory 126B/430B (a form of "computer-readable storage medium") may be any suitable component(s) for retaining programming instructions and/or data, such as random access memory (RAM), electrically erasable programmable read-only memory (EEPROM), flash memory, etc. Memory 430B associated with SD card 132B may be used for caching purposes to improve performance.

NICs 128B facilitate remote access to SSD 122B and HDD 124B when Host-B 110B is fully powered on. On the other hand, NICs 440B of controller 130B provides a separate network connection to facilitate access to SD card 132B when Host-B 110B is powered off. In practice, network interface 126B/430B may include one or more network interface cards (NICs).

Power Management and Virtual Machine Data Placement

Power management according to FIG. 2 may be implemented in conjunction with virtual machine data placement in virtualized computing environment 100. Here, the term "virtual machine data placement" or "data placement" may refer generally to a process of determining which storage resource to store data relating to virtual machine 112A/112B/112C. Virtual machine data placement is usually performed during the provisioning of a new virtual machine 112A/112B/112C, or when additional storage is allocated to an existing one.

Figure 5:
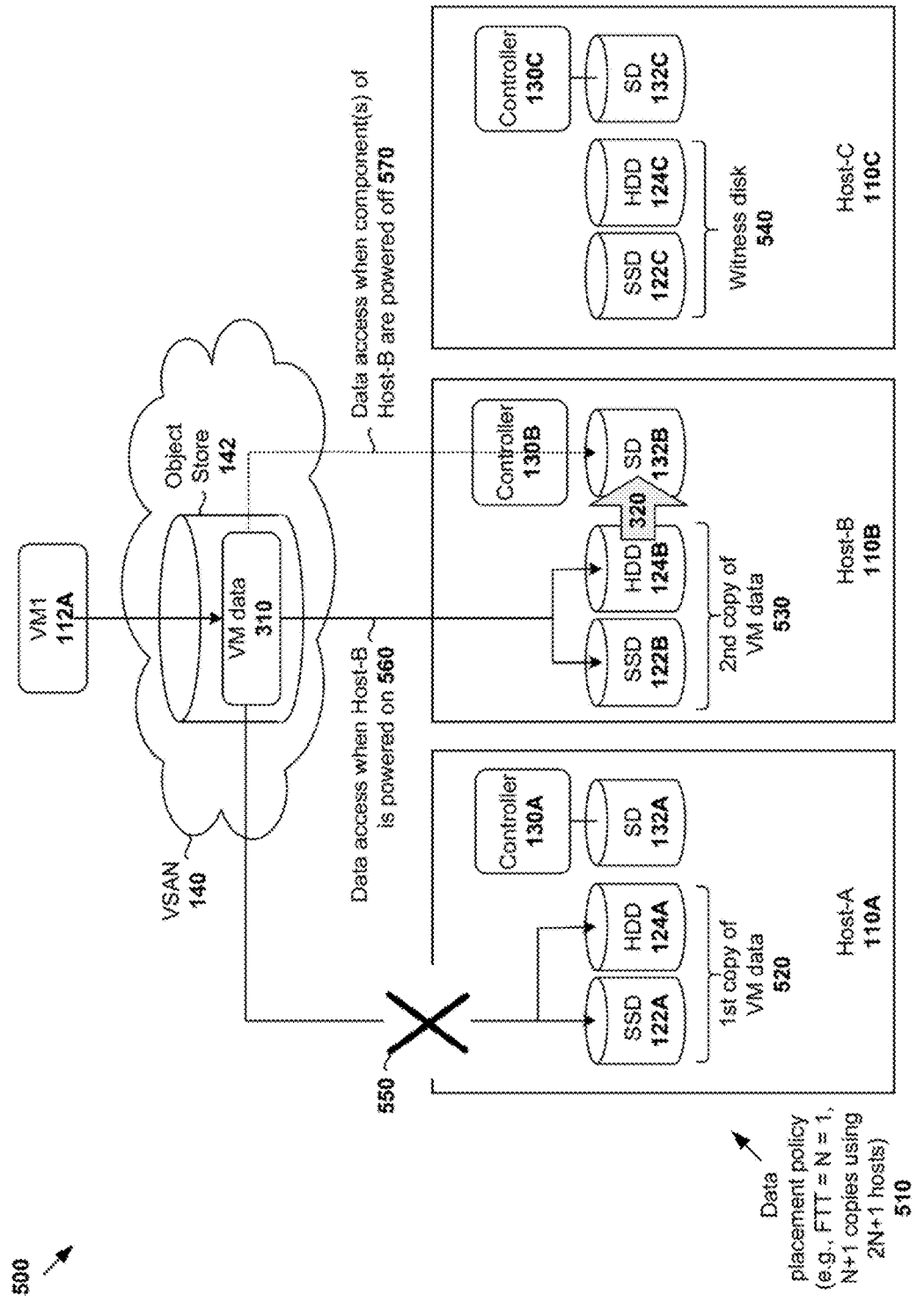
FIG. 5 is a schematic diagram illustrating example power management for a distributed storage system where virtual machine data is placed on three hosts according to a data placement policy.

To improve fault tolerance of distributed storage system 140, multiple copies of the same virtual machine data are generally placed on object store 142. For example, FIG. 5 is a schematic diagram illustrating example power management 500 for distributed storage system 140 where virtual machine data 310 is placed on three hosts according to a data placement policy 510. For simplicity, some components of Host-A 110A, Host-B 110B and Host-C 110C in FIG. 1 and FIG. 3 are not shown in FIG. 5. Similar to FIG. 3, virtual machine data 310 relates to VM1 112A supported by Host-A 110A, and Host-B 110B will be used as an example candidate for powering off.

In the example in FIG. 5, virtual machine data 310 is placed according to data placement policy 510 that defines a number of failures to tolerate (FTT). In particular, for FTT=N failures tolerated (N≥1), a total of 2N+1 hosts are required to place N+1 copies of the virtual machine data and N witness disk or disks. Here, the term "witness disk" may refer generally to a component that acts as a tiebreaker whenever decisions have to be made in cluster 105. Each witness disk generally contains metadata requiring less storage space than each copy of virtual machine data.

For FTT=N=1, three hosts are required to place two copies of virtual machine data and one witness disk. For VM1 112A in FIG. 5, first copy 520 is placed on SSD 122A/HDD 124A of Host-A 110A, second copy 530 on SSD 122B/HDD 124B of Host-B, and witness disk 540 on SSD 122C/HDD 124C of Host-C. The aim is to improve the resiliency of distributed storage system 140 due to a storage device failure, network failure, host failure, power failure, etc. In the event of a fault at Host-A 110A, SSD 122A or HDD 124A (see 550 in FIG. 5), second copy 530 on Host-B 110B may be accessed to keep VM1 112A running.

Figure 6:
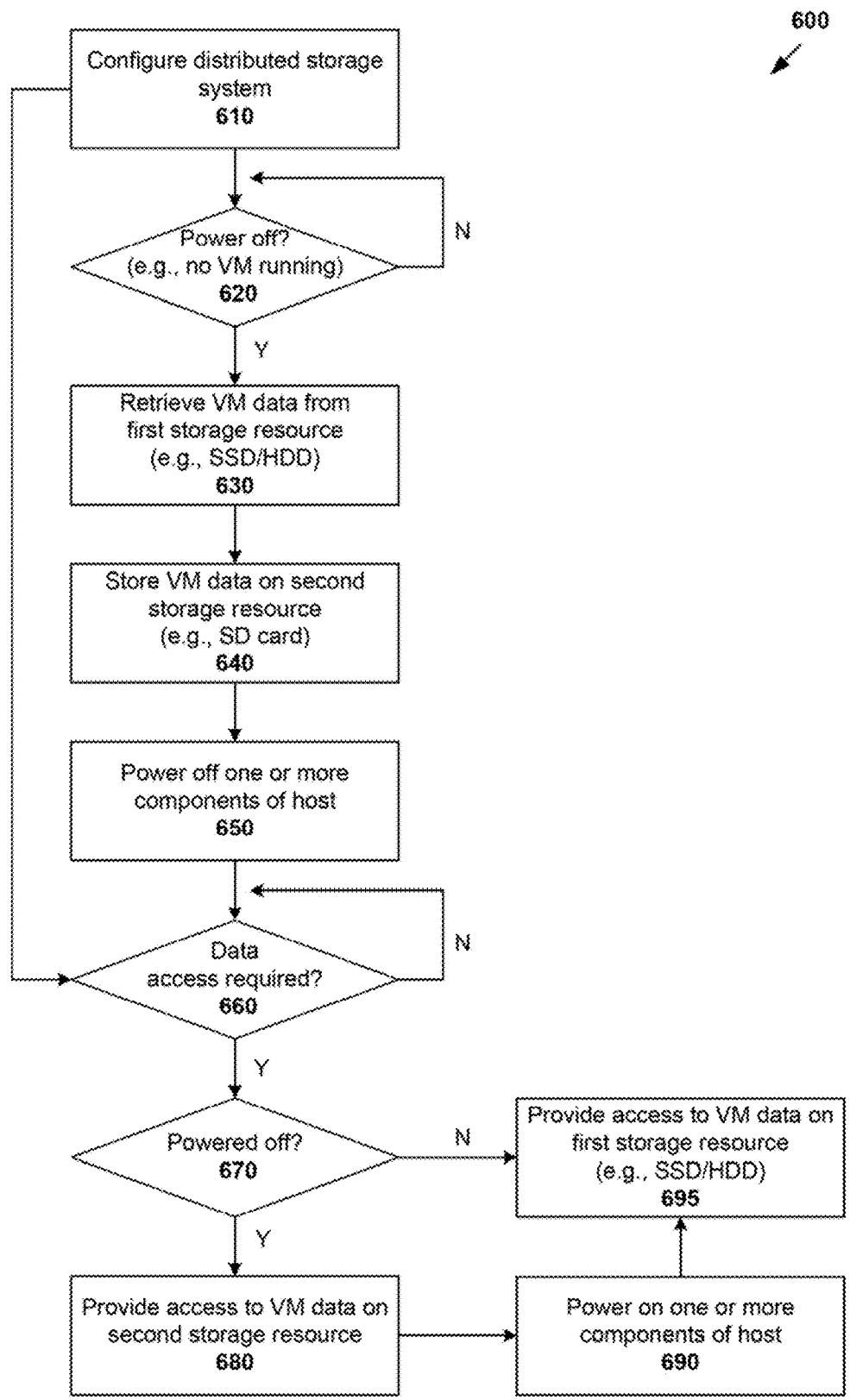
FIG. 6 is a flowchart of an example detailed process to perform power management for a distributed storage system according to the example process in FIG. 2.

As will be explained further using FIG. 6, second copy 530 is accessible from SSD 122B/HDD 124B when Host-B is powered on (see full line 560), and from SD card 132B when Host-B is powered off (see dotted line 570) to reduce power consumption. In more detail, FIG. 6 is a flowchart of example detailed process 600 for power management for distributed storage system 140 according to example process 200 in FIG. 2. Example process 600 may include one or more operations, functions, or actions illustrated by one or more blocks, such as blocks 610 to 695. The various blocks may be combined into fewer blocks, divided into additional blocks, and/or eliminated based upon the desired implementation.

Similar to example process 200, example process 600 may be performed using any suitable computing system in virtualized computing environment 100, such as host 110B (e.g., distributed storage module 118B), management entity 160 (e.g., distributed storage management module 162), a combination of host 110B and management entity 160, or any alternative or additional component, etc.

At block 610 in FIG. 6, distributed storage system 140 is configured to include the first storage resource and second storage resource of each host 110B within cluster 105. In the example in FIG. 5, SSD 122A, HDD 124A and SD card 132A of Host-A 110A, SSD 122B, HDD 124B and SD card 132B of Host-B 110B and SSD 122C, HDD 124C and SD card 132C of Host-C 110C are aggregated to create a pool of shared resources in the form of object store 142 that they may be used by all hosts within cluster 105.

As discussed using FIG. 3, Host-B 110B may include one cache device SSD 122B for read caching and write buffering, and one capacity device HDD 124B for persistent data storage. Similarly, SSD 122A/122C may be used for caching and HDD 124B/124C for data storage. SD card 132A/132B/132C may be a storage device (e.g., vFlash SD card) that is inserted into a card reader (not shown for simplicity in FIG. 3) of controller 130A/130B/130C.

In practice, management entity 160 (e.g., distributed storage management module 162) may receive data relating to the different storage resources from each host (e.g., from distributed storage module 118A/118B/118C, controller 130A/130B/130C, etc.) during the configuration process. Configuration at block 610 may include hosts 110A to 110C exporting respective SD cards 132A to 132C such that they are accessible by other hosts and management entity 160. In one example, Host-B 110B may create an object representing SD card 132B and share an interface to the object with management entity 160 or other hosts 110A and 110C. The interface (e.g., Internet Protocol (IP) address) may then be used to access second storage resource when Host-B 110B is powered off.

At block 620 in FIG. 6 (related to block 210 in FIG. 2), it is determined whether a power-off requirement of Host-B 110B is satisfied. This may include management entity 160 and/or Host-B 110B monitoring the resource utilization of Host-B 110B to determine whether there is any virtual machine 112B running. The requirement for Host-B 110B is satisfied when virtual machines 112B VM3 and VM4 are not running, or when maintenance is required.

At blocks 630 and 640 in FIG. 6 (related to blocks 220 and 230 in FIG. 2), in response to detecting that the requirement is satisfied, virtual machine data 310 may be retrieved from SSD 122B/HDD 124B (first storage resource) and stored on SD card 132B (second storage resource).

At block 650 in FIG. 6 (related to block 240 in FIG. 2), power consumption of Host-B 110B may be reduced by powering off one or more hardware 114B components of Host-B 110B. For example, the components may be processor 120B, memory 126B, NICs 128B, host bus 410B, etc.

At block 660 in FIG. 6 (related to block 250 in FIG. 2), it is determined whether access to second copy 530 of virtual machine data 310 is required. For example, access may be required when a request for an input/output (I/O) access to Host-B 110B is detected. In the example in FIG. 5, this may occur when there is a fault (see 550) at Host-A 110A that makes first copy 520 on SSD 122A/HDD 124A inaccessible. In practice, management entity 160 (e.g., using distributed storage management module 162) may manage access to the storage resources of Host-B 110B. In this case, Host-B 110B (e.g., using distributed storage module 118B or controller 130B) may detect that access to second copy 530 of virtual machine data 310 is required after receiving the request for I/O access via management entity 160.

Then, at blocks 670 and 695 in FIG. 6, if Host-B 110B is powered on, second copy 530 of virtual machine data 310 may be accessed from SSD 122B/HDD 124B. In this case, the access to SSD 122B/HDD 124B may be provided by Host-B 110B using distributed storage module 118B.

Otherwise, at blocks 670 and 680 in FIG. 6 (related to block 260 in FIG. 2), SD card 132B is accessed to keep VM1 112A running even though one or more components of Host-B are powered off. In this case, the access to SD card 132B may be provided by Host-B 110B using controller 130B.

At block 690 in FIG. 6, one of more components Host-B 110B may also be powered on, such as processor 120B, SSD 122B/HDD 122B, memory 126B, bus 410, etc. At block 695 in FIG. 6, in response to detecting that further access to virtual machine data 310 is required and Host-B 110B is powered on, second copy 530 of virtual machine data 310 stored on SSD 122B/HDD 122B may be accessed.

Powering on Host-B 110B at block 690 may improve performance, especially when SSD 122B/HDD 124B has better performance characteristics (e.g., access speed) than SD card 132B. In this case, once Host-B 110B is powered on and power to SSD 122B/HDD 124B restored, data access is generally faster via SSD 122B/HDD 124B. In practice, however, it may not be necessary to power on Host-B 110B at block 690, such as if SD card 132B offers similar or the same performance characteristics. Also, Host-B 110B may be powered on at block 670 for any other suitable reason.

Although an example is shown in FIG. 6, power management for distributed storage system 140 may be further improved by taking advantage of on-board memory 430B of controller 130B. Memory 430B may be used to perform caching for SD card 132B, such as to cache data, read/write operations, etc. Although not shown in FIG. 3, Host-A 110A may include a memory to perform read write caching for SD card 132A; and similarly one for SD card 132C. In this case, the memory may represent "third storage resource" of each host. On-board battery 450B may supply power to memory 430B.

Virtual Machine Data Placement

From the examples in FIG. 1 to FIG. 6, virtual machine data placement may be improved by taking advantage of different local storage resources of Host-A 110A, Host-B 110B and Host-C 110C in cluster 105. As explained using FIG. 5, data placement policy 510 with FTT=N failures tolerated (N≥1) requires a total of 2N+1 hosts to place N+1 copies of the virtual machine data and N witness disk(s).

According to examples of the present disclosure, the number of hosts required may be reduced. For example, by taking advantage of SD card 132A/132B/132C associated with controller 130A/130B/130C, the same N+1 copies and N witness disk(s) may be placed on N+1 instead of 2N+1 hosts, i.e., a saving of N host(s). Two examples will be illustrated using FIG. 7 for the case of FTT=1 (i.e., two hosts instead of three) and FIG. 8 for FTT=2 (three hosts instead of five).

Figure 7:
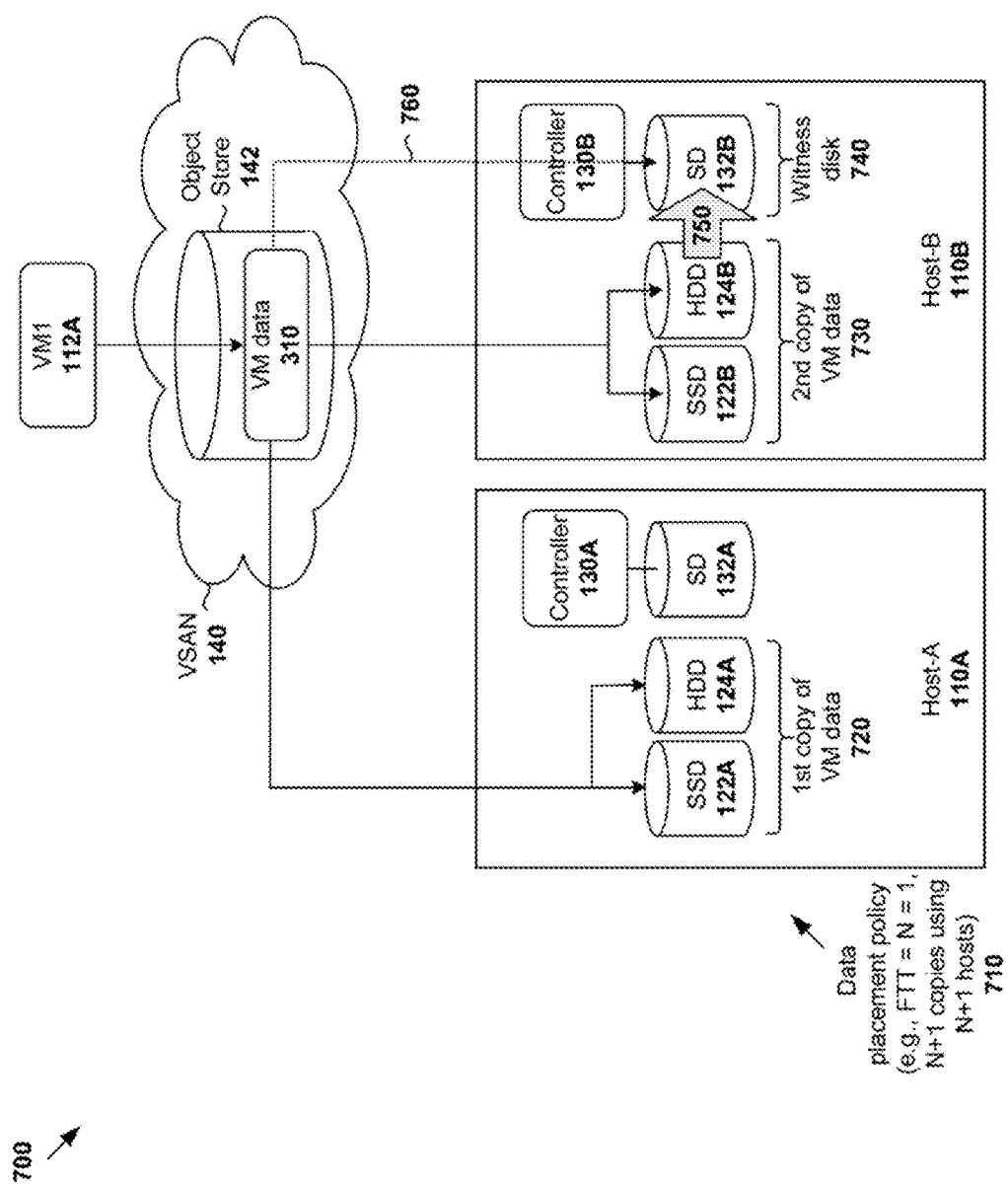
FIG. 7 is a schematic diagram illustrating example virtual machine data placement and power management for a distributed storage system where virtual machine data is placed on two hosts according to a data placement policy.

In more detail, FIG. 7 is a schematic diagram illustrating example virtual machine data placement and power management 700 for distributed storage system 140 when virtual machine data 310 is placed on two hosts (e.g., Host-A 110A and Host-B 110B) according to data placement policy 710. Similar to FIG. 5, data placement policy 710 with FTT=1 requires two copies of virtual machine data and one witness disk. However, instead of using all three hosts from cluster 105, Host-A 110A and Host-B 110B may be used by taking advantage of SD card 132B.

In this two-host configuration, first copy 720 of the virtual machine data is placed on SSD 122A/HDD 122B of Host-A 110A. Since there are different storage resources on Host-B 110B, second copy 730 may be placed on SSD 122B/HDD 124B, and witness disk 740 on SD card 132B. Second copy 730 may be accessed from SSD 122B/HDD 124B when Host-B 110B is powered on. However, when a power-off requirement of Host-B 110B is satisfied, one or more hardware components of Host-B 110B may be powered off and second copy 730 copied from SSD 122B/HDD 124B to SD card 132B. See arrow 750 and dotted line 760. In the event of a fault at Host-A 110A, second copy 730 may be accessed from SD card 132B. Further, Host-B 110B may be powered on to provide further access to second copy 730 on SSD 122B/HDD 124B.

Figure 8:
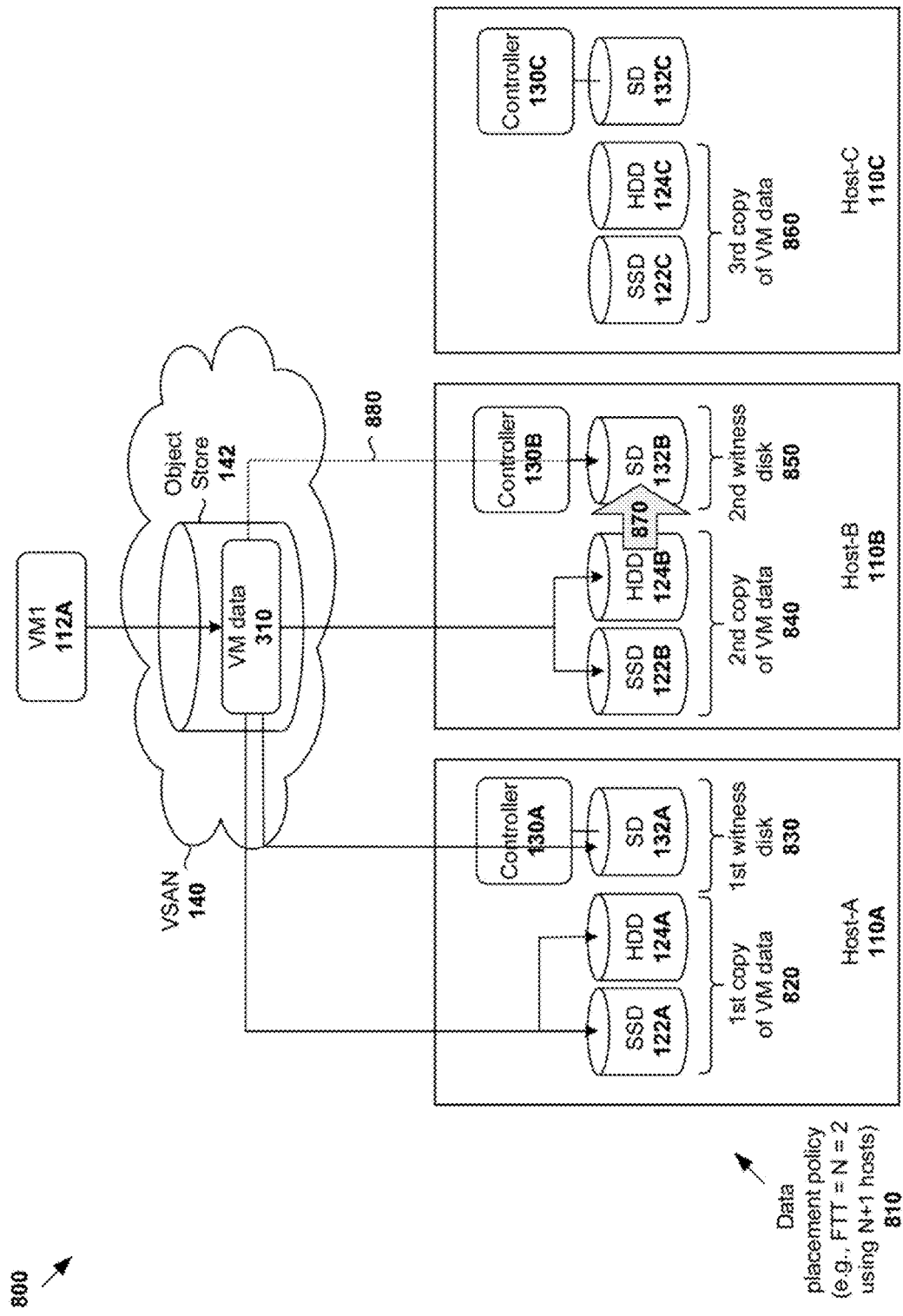
FIG. 8 is a schematic diagram illustrating example virtual machine data placement and power management for a distributed storage system where virtual machine data is placed on three hosts according to a data placement policy.

The above example may be extended to other values of FTT. For example, for FTT=N=2, fewer hosts 110B may be used to place three copies (i.e., 2+1) of virtual machine data and two witness disks. In more detail, FIG. 8 is a schematic diagram illustrating example virtual machine data placement 800 on distributed storage system 140 when virtual machine data 310 is placed on three hosts (e.g., Host-A 110A, Host-B 110B and Host-C 110C) according to data placement policy 810. In this case, the number of hosts required is reduced from five (i.e., 2N+1=5) to three (i.e., N+1=3).

In the example in FIG. 8, first copy 820 is placed on SSD 122A/HDD 124A, first witness disk 830 on SD card 132A, second copy 840 on SSD 122B/HDD 124B, second witness disk 850 on SD card 132B and third copy 860 on SSD 122C/HDD 124C. Similar to the example in FIG. 7, power management may be performed to power off Host-B 110B. Second copy 840 may be accessed from SSD 122B/HDD 124B when Host-B 110B is powered on.

However, when a power-off requirement of Host-B 110B is satisfied, one or more hardware components of Host-B 110B may be powered off and second copy 840 copied from SSD 122B/HDD 124B to SD card 132B. See arrow 870 indicating the copying process and dotted line 880 indicating data access when one or more components of Host-B 110B are powered off.

Similar improvement may be made for the case of FTT=N=4 to reduce the number of hosts 110B required to place five copies (i.e., 4+1) of virtual machine data and four witness disk. For example, instead of using nine hosts, five hosts are required by taking advantage of the SSD/HDD and SD card of each host. The examples in FIG. 7 and FIG. 8 may be extended to other values of FTT. By reducing the number of hosts required for virtual machine data placement, costs associated with power consumption and hardware maintenance of cluster 105 may be further reduced.

Computing System

Figure 9:
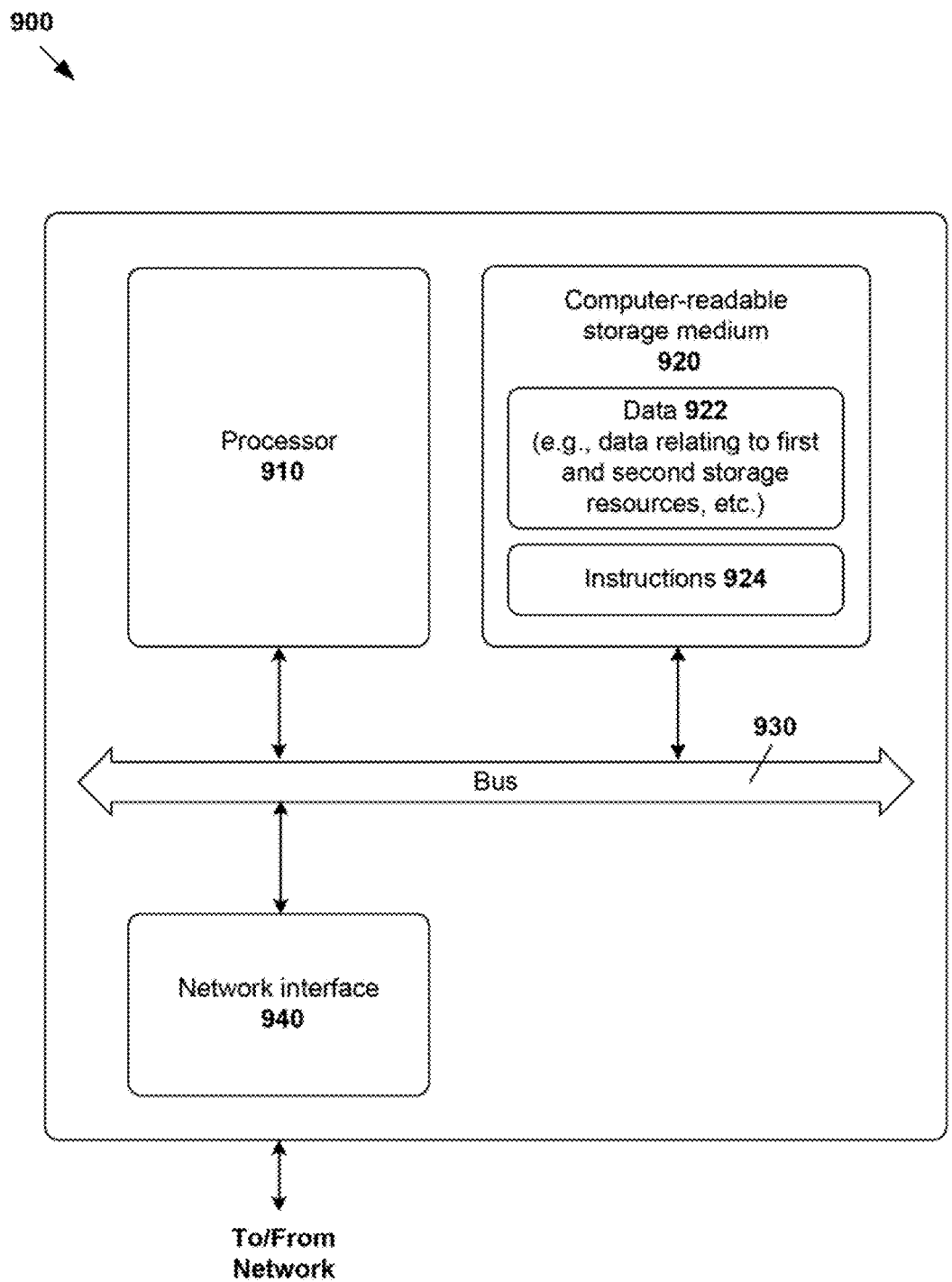
FIG. 9 is a schematic diagram illustrating an example computing system acting as a management entity.

The above examples can be implemented by hardware, software or firmware or a combination thereof. FIG. 9 is a schematic diagram of an example computing system 900 acting as management entity 170. Example computing system 900 for power management of distributed storage system 140 may include processor 910, computer-readable storage medium 920, network interface 940, and bus 930 that facilitates communication among these illustrated components and other components.

Processor 910 is to perform processes described herein with reference to FIG. 1 to FIG. 7. Computer-readable storage medium 920 may store any suitable data 922, such as data relating to first storage resource (e.g., SSDs and HDDs) and second storage resource (e.g., SD cards), etc. Computer-readable storage medium 920 may further store computer-readable instructions 924 which, in response to execution by processor 910, cause processor 910 to perform processes described herein with reference to FIG. 1 to FIG. 8.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

What is claimed is:

1. A method to perform power management for a distributed storage system accessible by a cluster in a virtualized computing environment, wherein the cluster includes a first host and at least one second host, the first host includes both a first physical storage resource and a second physical storage resource, and the method comprises:

in response to detecting that a power-off requirement of the first host is satisfied, retrieving virtual machine data from the first physical storage resource of the first host;

before powering off one or more hardware components of the first host, storing the virtual machine data on the second physical storage resource of the first host, wherein the second physical storage resource is configured to be accessible by the second host when the one or more hardware components of the first host are powered off; and powering off the one or more hardware components of the first host, while maintaining access to the virtual machine data stored on the second physical storage resource after the one or more hardware components are powered off.

2. The method of claim 1, further comprising:

detecting that access to the virtual machine data is required from the first host but the one or more hardware components of the first host are powered off; and providing access to the virtual machine data stored on the second physical storage resource instead of the first physical storage resource.

3. The method of claim 1, wherein providing access to the virtual machine data stored on the second physical storage resource comprises:

providing access to the virtual machine data via a controller associated with the second physical storage resource, the controller and second physical storage resource being powered by a power source even when the first host is powered off.

4. The method of claim 2, further comprising:

powering on the one or more hardware components of the first host;

detecting that further access to the virtual machine data is required and the one or more hardware components of the first host are powered on; and providing access to the virtual machine data stored on the first physical storage resource instead of the second physical storage resource.

5. The method of claim 4, wherein:

the first physical storage resource comprises at least one capacity device and at least one cache device;

retrieving the virtual machine data from the first physical storage resource comprises retrieving the virtual machine data from the at least one capacity device; and providing access to the virtual machine data stored on the first physical storage resource comprises providing access to the at least one cache device.

6. The method of claim 1, wherein:
the method further comprises configuring the distributed storage system to include the first physical storage resource and second physical storage resource of the first host;
the cluster includes N+1 hosts, being the first host and N second hosts;
the virtual machine data is stored on the first physical storage resource according to a data placement policy;
the data placement policy defines a number of failures to tolerate (FTT) to be N and requires the cluster of N+1 hosts to, collectively, store N+1 copies of virtual machine data and N witness disk or disks; and
the virtual machine data stored on the first physical storage resource is one of the N+1 copies of virtual machine data.

7. A non-transitory computer-readable storage medium that includes a set of instructions which, in response to execution by a processor of a computing system, causes the processor to perform a method of power management of a distributed storage system accessible by a cluster in a virtualized computing environment, wherein the cluster includes a first host and at least one second host, the first host includes both a first physical storage resource and a second physical storage resource, and the method comprises:
in response to detecting that a power-off requirement of the first host from the cluster is satisfied, retrieving virtual machine data from the first physical storage resource of the first host;
before powering off one or more hardware components of the first host, storing the virtual machine data on the second physical storage resource of the first host, wherein the second physical storage resource is configured to be accessible by the second host when the one or more hardware components of the first host are powered off; and
powering off the one or more hardware components of the first host, while maintaining access to the virtual machine data stored on the second physical storage resource after the one or more hardware components are powered off.

8. The non-transitory computer-readable storage medium of claim 7, wherein the method further comprises:
detecting that access to the virtual machine data is required from the first host but the one or more hardware components of the first host are powered off; and
providing access to the virtual machine data stored on the second physical storage resource instead of the first physical storage resource.

9. The non-transitory computer-readable storage medium of claim 7, wherein providing access to the virtual machine data stored on the second physical storage resource comprises:
providing access to the virtual machine data via a controller associated with the second physical storage resource, the controller and second physical storage resource being powered by a power source even when one or more hardware components of the first host are powered off.

10. The non-transitory computer-readable storage medium of claim 8, wherein the method further comprises:
powering on the one or more hardware components of the first host;
detecting that further access to the virtual machine data is required and the one or more hardware components of the first host are powered on; and
providing access to the virtual machine data stored on the first physical storage resource instead of the second physical storage resource.

11. The non-transitory computer-readable storage medium of claim 10, wherein:
the first physical storage resource comprises at least one capacity device and at least one cache device;
retrieving the virtual machine data from the first physical storage resource comprises retrieving the virtual machine data from the at least one capacity device; and
providing access to the virtual machine data stored on the first physical storage resource comprises providing access to the at least one cache device.

12. The non-transitory computer-readable storage medium of claim 7, wherein:
the method further comprises configuring the distributed storage system to include the first physical storage resource and second physical storage resource of the first host;
the cluster includes N+1 hosts, being the first host and N second hosts;
the virtual machine data is stored on the first physical storage resource according to a data placement policy;
the data placement policy defines a number of failures to tolerate (FTT) to be N and requires the cluster of N+1 hosts to, collectively, store N+1 copies of virtual machine data and N witness disk or disks; and
the virtual machine data stored on the first physical storage resource is one of the N+1 copies of virtual machine data.

13. A computing system configured to perform power management for a distributed storage system accessible by a cluster in a virtualized computing environment, wherein the cluster includes a first host and at least one second host, the first host includes both a first physical storage resource and a second physical storage resource, and the computing system comprises:
a processor; and
a non-transitory computer-readable storage medium storing instructions that, when executed by the processor, cause the processor to:
in response to detecting that a power-off requirement of the first host from the cluster is satisfied, retrieve virtual machine data from the first physical storage resource;
before powering off one or more hardware components of the first host, store the virtual machine data on the second physical storage resource, wherein the second physical storage resource is configured to be accessible by the second host when the one or more hardware components of the first host are powered off; and
power off one or more hardware components of the first host, while maintaining access to the virtual machine data stored on the second physical storage resource after the one or more hardware components are powered off.

14. The computing system of claim 13, wherein the instructions further cause the processor to:
detect that access to the virtual machine data is required from the first host but the one or more hardware components of the first host are powered off; and
provide access to the virtual machine data stored on the second physical storage resource instead of the first physical storage resource.

15. The computing system of claim 13, wherein the instructions further cause the processor to:

provide access to the virtual machine data stored on the second physical storage resource via a controller associated with the second physical storage resource, the controller and second physical storage resource being powered by a power source even when the one or more hardware components of the first host are powered off.

16. The computing system of claim 14, wherein the instructions further cause the processor to:
power on the one or more hardware components of the first host;
detect that further access to the virtual machine data is required and the one or more hardware components of the first host are powered on; and
provide access to the virtual machine data stored on the first physical storage resource instead of the second physical storage resource.

17. The computing system of claim 16, wherein the first physical storage resource comprises at least one capacity device and at least one cache device and the instructions further cause the processor to:
retrieve the virtual machine data from at least one capacity device of the first physical storage resource; and
provide access to the virtual machine data stored on the first physical storage resource via the at least one cache device.

18. The computing system of claim 13, wherein:
the instructions further cause the processor to configure the distributed storage system to include the first physical storage resource and second physical storage resource of the first host;
the cluster includes N+1 hosts, being the first host and N second hosts;
the virtual machine data is stored on the first physical storage resource according to a data placement policy;
the data placement policy defines a number of failures to tolerate (FTT) to be N and requires the cluster of N+1 hosts to, collectively, store N+1 copies of virtual machine data and N witness disk or disks; and
the virtual machine data stored on the first physical storage resource is one of the N+1 copies of virtual machine data.

* * * * *